United States Patent
Ikeda et al.

(10) Patent No.: US 8,304,048 B2
(45) Date of Patent: Nov. 6, 2012

(54) POLYLACTIC ACID-BASED RESIN COMPOSITION, POLYLACTIC ACID-BASED FILM, MOLDED PRODUCT USING THE FILM, ELONGATED FILM, HEAT-SHRINKABLE LABEL, AND CONTAINER HAVING THE LABEL THEREON

(75) Inventors: Masashi Ikeda, Shiga (JP); Kouichirou Taniguchi, Shiga (JP)

(73) Assignee: Mitsubishi Plastics, Inc., Tokyo (JP)

( * ) Notice: Subject to any disclaimer, the term of this patent is extended or adjusted under 35 U.S.C. 154(b) by 370 days.

(21) Appl. No.: 12/602,756

(22) PCT Filed: Jun. 6, 2008

(86) PCT No.: PCT/JP2008/060493
§ 371 (c)(1),
(2), (4) Date: May 20, 2010

(87) PCT Pub. No.: WO2008/149995
PCT Pub. Date: Dec. 11, 2008

(65) Prior Publication Data
US 2010/0239800 A1 Sep. 23, 2010

(30) Foreign Application Priority Data
Jun. 6, 2007 (JP) ................................. 2007-151046

(51) Int. Cl.
*B29D 22/00* (2006.01)
(52) U.S. Cl. ........ 428/35.7; 428/212; 525/186; 525/190
(58) Field of Classification Search .................. 428/212, 428/35.7, 35.1; 525/186, 190
See application file for complete search history.

(56) References Cited

U.S. PATENT DOCUMENTS

| | | | | |
|---|---|---|---|---|
| 2007/0290419 | A1* | 12/2007 | Goodman et al. | 266/189 |
| 2008/0076880 | A1* | 3/2008 | Nakagawa et al. | 525/190 |
| 2008/0914736 | * | 8/2008 | Lu | 524/35 |
| 2009/0326152 | A1* | 12/2009 | Li et al. | 525/190 |
| 2010/0143623 | A1* | 6/2010 | Hiruma et al. | 428/35.1 |
| 2010/0239800 | A1* | 9/2010 | Ikeda et al. | 428/35.7 |
| 2011/0144273 | A1* | 6/2011 | Li et al. | 525/190 |
| 2012/0035323 | A1* | 2/2012 | Donnelly | 525/64 |

FOREIGN PATENT DOCUMENTS

| | | | |
|---|---|---|---|
| JP | 10251498 | A | 9/1998 |
| JP | 2005266742 | A | 9/2005 |
| JP | 2005335095 | A | 12/2005 |
| JP | 2006117775 | A | 5/2006 |
| JP | 2006152162 | A | 6/2006 |
| JP | 2006233204 | A | 9/2006 |
| JP | 2007009008 | A | 1/2007 |
| JP | 2007052095 | A | 3/2007 |
| JP | 2007084816 | A | 4/2007 |
| JP | 2007119729 | A | 5/2007 |
| JP | 2007-177038 | A | 7/2007 |
| JP | 2007326961 | A | 12/2007 |
| JP | 2008075009 | A | 4/2008 |
| JP | 2008088363 | A | 4/2008 |

* cited by examiner

*Primary Examiner* — N. Edwards
(74) *Attorney, Agent, or Firm* — Oblon, Spivak, McClelland, Maier & Neustadt, L.L.P.

(57) ABSTRACT

A polylactic acid-based resin composition comprising: 50-90 mass % of a polylactic acid-based resin (A); and 10-50 mass % of a polyolefin-based resin (B), heat quantity of crystallization of the polyolefin-based resin (B) being 40 J/g or less as measured by using differential scanning calorimeter as measured at a thermal process comprising the steps of: heating up to 200° C. at a heating rate of 10° C./min; keeping the temperature at 200° C. for 5 minutes; and cooling down to the room temperature at a cooling rate of 10° C./min. The invention also provides: The composition may be applied, for example, to produce a polylactic acid-based film, a molded product using the film, an elongated film, a heat-shrinkable label, and a container having the heat-shrinkable label.

16 Claims, No Drawings

POLYLACTIC ACID-BASED RESIN COMPOSITION, POLYLACTIC ACID-BASED FILM, MOLDED PRODUCT USING THE FILM, ELONGATED FILM, HEAT-SHRINKABLE LABEL, AND CONTAINER HAVING THE LABEL THEREON

CROSS REFERENCE TO RELATED APPLICATIONS

The present application is the U.S. National Phase of International Patent Application Serial No. PCT/JP2008/060493, filed Jun. 6, 2008, which claims the benefit of Japanese Patent Application Serial No. 2007-151046, filed Jun. 6, 2007, both of which are hereby incorporated by reference herein in their entireties.

FIELD OF THE INVENTION

The present invention relates to a polylactic acid-based resin composition and a polylactic acid-based film; more specifically, it relates to a polylactic acid-based resin composition which comprises: a polylactic acid-based resin; and a polyolefin-based resin, and relates to a polylactic acid-based film which exhibits excellent flexibility and transparency.

BACKGROUND OF THE INVENTION

Petroleum-derived synthetic resin has excellent properties and an advantage of low cost so that it has been widely used. However, its degradability in natural environment is low and heat generation at incineration is large. Recently, in view of environmental protection, many studies and developments have been made on polymers degradable by microbe existing in soil and water.

Among the biodegradable polymers, there is a polylactic acid as a melt-moldable resin. Since polylactic acid exhibits excellent properties such as high thermal-resistance and high strength, it has been studied for various applications such as film, sheet, and textile. To impart impact-resistance and flexibility to the stiff and brittle polylactic acid, a material in which polyolefin is mixed has been widely researched. However, between polylactic acid and polyolefin, there are usually significant difference in refractive index and low compatibility at a time of mixing. As the mixed resin composition is internally separated and forms clear interface, it is difficult to obtain a transparent material.

To solve the above problems, for example, Patent document 1 discloses a resin composition, which is obtained by mixing a polylactic acid-based resin (PLA) and a polyolefin-based elastomer (PO) at a mass ratio of PLA/PO=90/10 to 60/40 and which exhibits excellent compatibility between stiffness and flexibility, and a molded product produced by the composition. About the molded product, flexibility is improved by mixing polylactic acid with olefin-based elastomer of at least one selected from the group consisting of: ethylene-propylene rubber, ethylene-octene rubber, and ethylene-butadiene rubber. However, in the document, there is neither examination nor description about the relation between crystalline of the used olefin-based elastomer and transparency of both the obtained resin composition and molded product. In addition, the compatibility between the polylactic acid and olefin-based elastomer used in the document is bad, thereby a resin composition having excellent balance between flexibility and transparency as well as the molded product are hardly obtained.

Patent document 2 discloses a naturally-degrading resin composition in which 99-85 mass % of an aliphatic polyester containing a lactic acid as the main component and 1-15 mass % of a syndiotactic polypropylene (SPP) are mixed. The SPP contained in the resin composition, compared with conventional isotactic polypropylene, shows low crystalline so that the document states that due to the property, it is possible to maintain transparency and to impart flexibility and impact-resistance of the polyolefin. Nevertheless, SPP is a special polypropylene; for imparting sufficient flexibility to an aliphatic polyester mainly containing a lactic acid, the crystalline is still high. Therefore, it is still hard to obtain a resin composition which exhibits excellent compatibility of flexibility and transparency.

Patent Document 1: Japanese Patent Application Laid-Open (JP-A) No. 2006-152162
Patent Document 2: JP-A No. 10-251498

SUMMARY OF THE INVENTION

Accordingly, an object of the present invention is to provide: a polylactic acid-based resin composition which comprises a polylactic acid-based resin and a polyolefin-based resin and which exhibits excellent high-toughness and transparency; a polylactic acid-based film; a molded product using the film; an elongated film; a heat-shrinkable film; and a container having the film thereon.

The inventors engaged in an intensive study. As a result, they discovered that a polylactic acid-based film having excellent flexibility and transparency can be obtained using a resin composition in which a polylactic acid-based resin and a polyolefin-based resin having a specific thermal property. Then, they had completed the present invention.

In other words, the object of the invention can be solved by a polylactic acid-based resin composition comprising: 50-90 mass % of a polylactic acid-based resin (A); and 10-50 mass % of polyolefin-based resin (B), heat quantity of crystallization of the polyolefin-based resin (B) being 40 J/g or less as measured by differential scanning calorimeter at a thermal process comprising the steps of: heating up to 200° C. at a heating rate of 10° C./min; keeping the temperature at 200° C. for 5 minutes; and cooling down to the room temperature at a cooling rate of 10° C./min. Alternatively, the object can be solved by a polylactic acid-based film comprising: a resin composition comprising: 50-90 mass % of a polylactic acid-based resin (A); and 10-50 mass % of polyolefin-based resin (B), internal haze of the film per micrometer (μm) in thickness is below 0.45%, heat quantity of crystallization of the polyolefin-based resin (B) being 40 J/g or less as measured by differential scanning calorimeter at a thermal process comprising the steps of: heating up to 200° C. at a heating rate of 10° C./min; keeping the temperature at 200° C. for 5 minutes; and cooling down to the room temperature at a cooling rate of 10° C./min.

Another object of the present invention can be solved by: a laminated body having at least one layer of the polylactic acid-based film of the invention, an elongated film wherein the laminated body or the polylactic acid-based film is elongated at least in one direction; a heat-shrinkable film of which heat shrinkage ratio in the main shrinking direction is 20% or more as measured after immersing the film in hot water of 80° C. for 10 seconds; a molded product being formed from the film, the laminated body, the elongated film, or a heat-shrinkable film; a heat-shrinkable label using the heat-shrinkable film as the base material; and a container having the heat-shrinkable label thereon.

Since the present invention comprises a polylactic acid-based resin (A) and a specific polyolefin-based resin (B), the invention can provide a polylactic acid-based resin composition having excellent flexibility and transparency. The invention can also provide a polylactic acid-based film.

Moreover, the invention can provide an elongated film, a heat-shrinkable label, a molded product, and a container having the heat-shrinkable label thereon, those of which exhibit excellent transparency and flexibility.

DETAILED DESCRIPTION OF THE INVENTION

Hereinafter, a polylactic acid-based resin composition, a polylactic acid-based film, a laminated body, an elongated film, a heat-shrinkable film, a molded product, and a container will be specifically described as a mode of the present invention.

It should be noted that in the subject specification, the term "main component" means a most-contained component; it is usually contained at a ratio of 50 mass % or more, preferably 80-100 mass % or less. The term "film" means a thin and flat product where thickness is extremely small compared with its length and width; the maximum thickness is optionally, limited and the film is usually provided in a form of roll (Japanese Industrial Standard: JIS K6900). On the other hand, a term "sheet", based on the definition of JIS, means a thin and flat product whose thickness is usually small compared with its length and width. However, the difference between "sheet" and "film" is not clear; besides, there is no necessity to distinguish film from sheet in the invention. So, the term "film" in the invention may include "sheet".

[Polylactic Acid-Based Resin Composition and Polylactic Acid-Based Film]

The polylactic acid-based resin composition and polylactic acid-based film of the invention comprise (or contain as the main Component) a polylactic acid-based resin (A) and a particular polyolefin-based resin (B).

<Polylactic Acid-Based Resin (A)>

The (A) component used in the invention is a polylactic acid-based resin. The (A) component includes a homopolymer of D-lactic acid or L-lactic acid, a copolymer thereof, or a mixture of these.

More specifically, a poly(D)-lactic acid whose structural unit is a D-lactic acid, a poly(L)-lactic acid whose structural unit is a L-lactic acid, a poly (DL)-lactic acid being a copolymer of L-lactic acid and D-lactic acid, or the mixture thereof.

When the (A) component of the invention is the above mixture, mixing ratio of D-lactic acid and L-lactic acid is: preferably (D-lactic acid)/(L-lactic acid)=99.8/0.2 to 75/25, or (D-lactic acid)/(L-lactic acid)=0.2/99.8 to 25/75; more preferably (D-lactic acid)/(L-lactic acid)=99.5/0.5 to 80/20 or (D-lactic acid)/(L-lactic acid)=0.5/99.5 to 20/80. A polylactic acid having D-lactic acid only or L-lactic acid only tends to show extremely high crystalline and high melting point and tends to exhibit excellent thermal-resistance and mechanical property. However, when it is used as a film, a printing process and a process using solvent are included in the manufacturing process. To improve printability and solvent seal property, the crystallinity of the structural material itself has to be adequately lowered. Moreover, when the crystallinity is extremely high, orientation-induced crystallization is developed at elongation, thereby the shrinkable property tends to be deteriorated. Accordingly, mixing ratio of D-lactic acid and L-lactic acid is preferably adequately determined depending on the application of the film and so on.

In the invention, the polylactic acid-based resin (A) may comprise a D-lactic acid and a L-lactic acid these of which have different copolymerization ratio. In that case, average value of the copolymerization ratio between D-lactic acid and L-lactic acid in a plurality of the lactic acid-based polymers should be within the above range. Depending on the application, by mixing two or more polylactic acid-based resins each of which has different copolymerization ratio between D-lactic acid and L-lactic acid and adjusting the crystallinity, it is capable of making a balance between thermal-resistance and transparency.

The polylactic acid-based resin (A) used in the invention may be a copolymer of lactic acid with α-hydroxy carboxylic acid, aliphatic diol, or aliphatic dicarboxylic acid. Here, examples of "α-hydroxy carboxylic acid" copolymerized with lactic acid-base resin include: optical isomer of lactic acid (i.e. D-lactic acid to the L-lactic acid; L-lactic acid to the D-lactic acid.); bifunctional aliphatic hydroxyl carboxylic acids such as glycolic acid, 3-hydroxy butyric acid, 4-hydroxy butyric acid, 2-hydroxy-n-butyric acid, 2-hydroxy-3,3-dimethyl butyric acid, 2-hydroxy-3-methyl butyric acid, 2-methyl butyric acid, and 2-hydroxy caprolactone; and lactones such as caprolactone, butyl lactone, and valerolactone. Examples of "aliphatic diol" copolymerized with lactic acid-based resin include: ethylene glycol, 1,4-butane diol, and 1,4-cyclohexane dimethanol. In addition, examples of copolymerized "aliphatic dicarboxylic acid" include: succinic acid, adipic acid, suberic acid, sebacic acid, and dodecanedioate. Copolymerization ratio about a copolymer of lactic acid with α-hydroxy carboxylic acid, aliphatic diol, or aliphatic dicarboxylic acid: i.e. (lactic acid)/{(α-hydroxy carboxylic acid), (aliphatic diol), or (aliphatic dicarboxylic acid)} is preferably within the range of 90/10 to 10/90, more preferably 80/20 to 20/80, and furthermore preferably 70/30 to 30/70. If the copolymerization ratio is within the above range, it is capable of obtaining a resin composition having a favorable balance among properties such as stiffness, transparency, and impact-resistance.

The polylactic acid-based resin (A) used in the invention can be produced by a known method such as condensation polymerization and ring-opening polymerization. For example, in condensation polymerization method, by directly carrying out dehydration condensation polymerization with D-lactic acid, L-lactic acid, or a mixture thereof, it is capable of obtaining a polylactic acid-based resin having given compositions. Further, in ring-opening polymerization method, by carrying out ring-opening polymerization of lactide which is a cyclic dimer of lactic acid by using necessary amount of polymerization adjuster in the presence of catalyst, it is capable of obtaining a polylactic acid-based resin. Among the lactide, there is a DL-lactide which is a dimer of L-lactic acid; by mixing and polymerizing the lactide as required, it is capable of obtaining a polylactic acid-based resin having a given compositions and crystalline. Still further, for the purpose of increasing molecular weight, a small amount of chain extender, for instance, diisocyanate compound, diepoxy compound, acid anhydride, and acid chloride may be used.

Mass-average molecular mass of the polylactic acid-based resin (A) is 20,000 or more, preferably 40,000 or more, more preferably 60,000 or more; the upper limit is 400,000 or less, preferably 350,000 or less, more preferably 300,000 or less. If the mass-average molecular mass is 20,000 or more, adequate resin cohesive force can be obtained, which can inhibit shortage of strength-and-elongation and embrittlement of the produced film. On the other hand, if the mass-average molecular mass is 400,000 or less, melting viscosity can be lowered, thereby it is preferable in view of production and its productivity.

Examples of commercially available product of the polylactic acid-based resin (A) may be "NATURE WORKS" manufactured by Nature Works LLC, "LACEA" manufactured by Mitsui Chemicals, Inc., and "U'Z SERIES" manufactured by TOYOTA MOTOR CORPORATION.

To improve impact-resistance, within the range which does not undermine transparency and flexibility, a rubber component other than polylactic acid-based resin (A) is preferably added to the polylactic acid-based resin (A). Suitable examples of the rubber component include, but not particularly limited to: aliphatic polyester other than polylactic acid-based resin (A), aromatic-aliphatic polyester; copolymer or core-shell rubber of a diol, a dicarboxylic acid, and a lactic acid-based resin; ethylene-vinyl acetate copolymer (EVA); ethylene-acrylic acid copolymer (EAA); ethylene-ethyl acrylate copolymer (EEA); ethylene-(meth) acrylic acid copolymer (EMA); and ethylene-methyl(meth) acrylic acid copolymer (EMMA).

Examples of the aliphatic polyester obtained by condensation of aliphatic diol and aliphatic dicarboxylic acid may be: a polymer obtainable by condensation of one or a combination of two or more kinds of aliphatic diol and aliphatic dicarboxylic acid each of which is selected from the below-described group; or a polymer as a desired high molecule compound obtainable by raising the molecular mass with isocyanate compound and so on, as required. As the aliphatic diol, there may be ethylene glycol, propylene glycol, 1,4-butanediol, and 1,4-cyclohexane dimethanol; as aliphatic dicarboxylic acid, there may be succinic acid, adipic acid, suberic acid, sebacic acid, and dodecanedioate.

Further, examples of aliphatic polyester obtained by ring-opening condensation of cyclic lactones include: ring-opened polymers of ε-caprolactone, σ-valerolactone and β-methyl-σ-valerolactone, as a cyclic monomer. The cyclic monomer is not only single kind, but also plural kind of cyclic monomers can be selected for copolymerization.

Still further, as for synthetic aliphatic polyester, there may be a copolymer of cyclic acid anhydride and oxiranes; for example, copolymer of succinic anhydride and ethylene oxide, or copolymer of succinic anhydride and propion oxide.

Typical aliphatic polyester other than these polylactic acid-based resins may be "BIONOLE" (manufactured by Showa Highpolymer Co., Ltd.) obtained by polymerizing succinic acid and 1,4-butanediol with adipic acid. As the aliphatic polyester obtained by ring-opening polymerization of ε-caprolactone, for example, "CELGREEN" (manufactured by Daicel Chemical Industries, Ltd.) is commercially available.

Next, example of aromatic-aliphatic polyester may be the one whose crystalline is lowered by introducing aromatic ring between aliphatic chains. The aromatic-aliphatic polyester can be obtained by e.g. condensation of aromatic dicarboxylic acid, aliphatic dicarboxylic acid, and aliphatic diol.

Examples of the above aromatic dicarboxylic acid include isophthalic acid, terephthalic acid, and 2,6-naphthalene dicarboxylic acid; among them, terephthalic acid is most preferably used. Also, examples of aliphatic dicarboxylic acid include succinic acid, adipic acid, suberic acid, sebacic acid, and dodecanedioate; among them, adipic acid is most preferably used. Each of aromatic-dicarboxylic acid, aliphatic dicarboxylic acid, or aliphatic diol may be used in combination of two or more kinds thereof.

Typical examples of aromatic-aliphatic polyester include copolymer of tetramethylene adipate with terephthalate and copolymer of polybutylene adipate with terephthalate. As the copolymer of tetramethylene adipate with terephthalate, "EASTER BIO" manufactured by Eastman Chemical Company can be commercially available; as the copolymer of polybutylene adipate with terephthalate, "ECOFLEX" manufactured by BASF CORPORATION can be commercially available.

With respect to the structure of copolymer of polylactic acid-based resin, dial, and dicarboxylic acid may be anyone of random copolymer, block copolymer, and graft copolymer. In view of film's impact-resistance and transparency, block copolymer or graft copolymer is preferable. A specific example of the random copolymer is "GS-PLA" manufactured by Mitsubishi Chemical Corporation. A specific example of block copolymer or graft copolymer is "PLA-MATE" manufactured by DIC Corporation.

Production method of copolymer of polylactic acid-based resin, diol, and dicarboxylic acid is, but not specifically limited to, a method of ring-opening polymerization or ester exchange reaction of polyester or polyether polyol, these of which have a structure formed by dehydration condensation of diol and dicarboxylic acid with lactide. It may also be a method of dehydration/deglycol condensation or ester exchange reaction of polyester or polyether polyol, these of which have a structure formed by dehydration condensation of diol and dicarboxylic acid with polylactic acid-based resin.

The copolymer of polylactic acid-based resin with diol and dicarboxylic acid can be adjusted to have a predetermined molecular mass using isocyanate compound and/or carboxylic anhydride. It should be noted that in view of workability and mechanical properties, the mass-average molecular mass is 50,000 or more, preferably 100,000 or more, and 300,000 or less, preferably 250,000 or less.

<Polyolefin-Based Resin (B)>

With regard to the polyolefin-based resin (B) of the invention, in view of transparency, it is important that the heat quantity of crystallization ($\Delta Hc$) is 40 J/g or less. Average refractive index of the polyolefin-based resin is affected by the crystallinity; a polyolefin-based resin having lower heat quantity of crystallization ($\Delta Hc$) tends to reduce its average refractive index. In the invention, by using a polyolefin-based resin (B) having lower heat quantity of crystallization than that of conventional polyolefin-based resin (heat quantity of crystallization ($\Delta Hc$)>40 J/g, usually about 60-100 J/g), it is capable of reducing difference of refractive index between the polyolefin-based resin (B) and the polylactic acid-based resin (A) to maintain excellent transparency. To further improve the transparency, heat quantity of crystallization ($\Delta Hc$) of the polyolefin-based resin (B) is preferably 30 J/g or less, more preferably 25 J/g or less, and further more preferably 20 J/g or less. Alternatively, a non-crystalline polyolefin-based resin which does not generate heat quantity of crystallization can be suitably used.

It should be noted that the heat quantity of crystallization ($\Delta Hc$) can be measured using a differential scanning calorimeter (DSC); specifically, it is shown as a heat quantity measured at a thermal process comprising the steps of: heating up to 200° C. at a heating rate of 10° C./min; keeping the temperature at 200° C. for 5 minutes; and cooling down to room temperature at a cooling rate of 10° C./min.

In view of formability and mechanical properties such as flexibility and transparency, examples of the polyolefin-based resin (B) preferably include: a polyethylene-based resin, a polypropylene-based resin, or a mixture thereof, those of which have a heat quantity of crystallization ($\Delta Hc$) within the above range.

In case of polyolefin-based resin, as a means to adjust the heat quantity of crystallization ($\Delta Hc$) within the above range, a method to form a copolymer or a method to reduce stereoregularity is suitably used. Suitable examples of copolymer include propylene-α-olefin copolymer and ethylene-α-olefin copolymer. The α-olefin used for the copolymer is preferably $C_2$-$C_{20}$ α-olefin, specific examples thereof include: ethylene, 1-butene, 1-pentene, 1-hexene, 1-heptene, 1-octene, 1-nonene, and 1-decene. In view of heat quantity of crystallization as well as impact-resistance, flexibility, and transparency, a copolymer containing α-olefin unit at a ratio of 5 mass % or more, preferably 7-30 mass % is particularly suitably used. Moreover, copolymerizing α-olefin may use one kind or in combination of two or more kinds thereof.

In the invention, as the polyolefin-based resin (B), in view of industrial availability with reasonably inexpensive cost and a balance among thermal-resistance, low-crystalline, and flexibility, propylene-ethylene random copolymer is preferably used.

The melt flow rate (MFR) of the polypropylene-based resin is not specifically restricted; preferable MFR in accordance with JIS K7210 at a temperature of 230° C. and a load of 21.18 N is usually 0.5 g/10 min or more, preferably 1.0 g/10 min or more, and 15 g/10 min or less, preferably 10 g/10 min or less. In consideration of kneading, materials having similar melting viscosity to that of polylactic acid-based resin are preferably selected to meet the MFR range.

The manufacturing method of the polyolefin-based resin is not particularly limited. The examples thereof include a known polymerization method using a known olefin polymerization catalyst, such as slurry copolymerization, solution copolymerization, mass polymerization, and gas-phase polymerization respectively using multisite catalyst represented by Ziegler-Natta Catalyst or singlesite catalyst represented by metallocen-based catalyst; the examples also include mass polymerization using radical initiator.

Content rate of the polylactic acid-based resin (A) constituting the resin composition and the film of the present invention must be 50-90 mass %; content rate of the polyolefin-based resin (B) of the invention must be 10-50 mass %. When content rate of the polylactic acid-based resin (A) is 50 mass % or more, it is capable of imparting sufficient stiffness and thermal-resistance to the resin composition and the film; the content rate is preferably 60 mass % or more, more preferably 70 mass % or more. When content rate of the polylactic acid-based resin (A) is 90 mass % or less, it is capable of imparting flexibility, as a characteristics of the polyolefin-based resin (B), to the resin composition and the film; the content rate is preferably 80 mass % or less.

Transparency of a polymer blend is affected by particle diameter of the disperse phase and difference of average refractive index between disperse phase and matrix phase. In case where particle diameter of the disperse phase is smaller than visual-light range, the resin composition exhibits excellent transparency. On the other hand, in case where particle diameter of the disperse phase is larger than visual-light range, the smaller the difference of the average refractive index between the disperse phase and the matrix phase is, the more excellent the transparency becomes. In general, compatibility between the polylactic acid-based resin (A) and the polyolefin-based resin (B) is bad and particle diameter of the disperse phase becomes larger; therefore, transparency of the resin composition and the film obtained from the polylactic acid-based resin (A) and the polyolefin-based resin (B) is greatly affected by the difference of average refractive index of both components.

From the above point of view, transparency of the resin composition and the film of the invention is largely affected by average refractive indices of the polylactic acid-based resin (A) and the polyolefin-based resin (B) to be used. In general, average refractive index of the polylactic acid-based resin is about 1.45-1.46, average refractive index of the polyolefin-based resin is about 1.50-1.51; so, the absolute value of the difference between them is about 0.04-0.06. When the value exceeds 0.04, the obtained resin composition and the film tend to show white turbidity.

On the other hand, the polyolefin-based resin (B) used in the invention is a low-crystalline polyolefin-based resin and the average refractive index is about 1.47-1.49; whereby it is capable of making the difference of average refractive index with the polylactic acid-based resin (A) smaller. When absolute value of the difference of average refractive index between the polylactic acid-based resin (A) and the polyolefin-based resin (B) is 0.04 or less, it is capable of obtaining a resin composition and a film each showing excellent transparency; the absolute value is preferably 0.03 or less, more preferably 0.02 or less in view of further improvement of transparency.

Internal haze of the film of the invention can be measured in accordance with JIS K7105. Internal haze depends on the thickness so that the internal haze of the film of the present invention is determined by dividing the measured value by film thickness to obtain a value per 1 μm in thickness. The internal haze of the film of the invention is essentially below 0.45% per 1 μm in thickness; it is more preferably 0.35% or less, more preferably 0.30% or less. When the internal haze is 0.45% or more per 1 μm in thickness, transparency of the film is significantly deteriorated that results in a film of white turbidity.

Next, a method for manufacturing the resin composition and the film of the present invention will be described. For the resin composition of the invention, conventional monoaxial extruder, biaxial extruder, kneader, mixer, and so on can be used and the equipment for manufacturing the resin composition and the film according to the present invention is not particularly Limited. In view of homogenous dispersiveness of the mixed resin composition and stability of the various properties of the obtained film, a biaxial extruder, particularly a co-rotating biaxial extruder is preferably used.

The method for manufacturing film of the invention is not restricted; it can be formed usually into a film having a thickness of about 5-5000 μm using known methods, for example, such as extrusion casting using T-die, calendar molding, inflation molding, and injection molding.

In the manufacturing method of the invention, to avoid hydrolysis in the extruder, the polylactic acid-based resin (A) to be used must be sufficiently dried in advance such that the moisture is 0.1 mass % or less, preferably 0.05 mass % or less. Example of drying may be carried out under a condition at a temperature of 55° C. for 24 hours (vacuume drying). Alternatively, the so-called "extrusion without drying" by carrying out vent vacuume using co-rotating biaxial extruder or monoaxial vent-type extruder may be a suitably method.

To the resin composition and film of the invention, for the purpose of improving or adjusting the various properties, within the range which does not significantly undermine the effect of the invention, other resins, modifier, filler, plasticizer, lubricant, antistatic agent, ultraviolet absorber, stabilizer, and so on can be adequately added.

The film of the invention is a high-performance film having high transparency while maintaining strength and thermal-resistance of the polylactic acid-based resin, flexibility of the polyolefin-based resin. Hence, it is advantageous for materials such as shrinkable label and sheet. In addition, since the resin composition of the invention comprises both the polylactic acid-based resin and the polyolefin-based resin, the film of the invention can be advantageous to be used as an adhesive layer each surface of which is capable of binding a different material from that of the other surface; the material bound on each side of the adhesive layer is the one containing polylactic acid as the main component or polyolefin as the main component.

[Laminated Body, Elongated Film and Heat-Shrinkable Film]

The film of the invention, in case where the film has a laminated structure, may have at least one layer mainly containing the above polylactic acid-based resin (A) and the polyolefin-based resin (B); resins composing other layers are, but not specifically limited to, preferably a thermoplastic resin, particularly preferably a polylactic acid-based resin, a polyolefin-based resin, or a mixture thereof.

A suitable example of the laminated body of the example is a laminated body having: a (I) layer made of the film of the invention; a (II) layer containing the polylactic acid-based resin (A) as the main component; and a (III) layer containing the polyolefin-based resin (B) as the main component. The layer structure of the laminated body of the invention is preferably a five-layer structure of:

(II) layer/(I) layer/(III) layer/(I) layer/(II) layer.

The (II) layer containing the polylactic acid-based resin (A) as the main component desirably contains the polylactic acid-based resin (A) at a ratio of 55 mass % or more, preferably 60 mass % or more, more preferably 65 mass % or more. When content of polylactic acid-based resin (A) is 55 mass % or more, rubber component other than polylactic acid-based resin (A) can be added thereto, to improve impact-resistance.

The (III) layer containing the polyolefin-based resin (B) as the main component desirably contains the polyolefin-based resin (B) at a ratio of 55 mass % or more, preferably 60 mass % or more, more preferably 65 mass % or more. When content of the polyolefin-based resin (B) is 55 mass % or more, as required, petroleum resin and the like can be adequately added thereto, to maintain low-temperature elongation property.

In the laminated body of the invention, thickness ratios for the (I) layer, the (II) layer, and the (III) layer can be adequately determined depending on the applications. Thickness of the (I) layer is preferably within the range of 0.5 μm or more, preferably 1 μm or more, and 6 μm or less, preferably 5 μm or less. Thickness ratio of the (II) layer to the total thickness of the film is 10% or more, preferably 20% or more; and the upper limit is 75%, preferably 65% or less. Thickness ratio of the (III) layer to the total thickness of the film is 20% or more, preferably 30% or more; the upper limit is 80% or less, preferably 70% or less. When each layer satisfies the thickness within the above range, it is capable of obtaining a laminated film which exhibits excellent flexibility and transparency.

Thickness of the laminated body of the invention is not specifically limited; it is usually 10 μm or more, preferably 30 μm or more, and 500 μm or less, preferably 300 μm or less. When thickness is 10 μm or more, handleability of the laminated body is favorable; on the other hand, when it is 500 μm or less, the laminated film exhibits excellent transparency and shrink workability, the thickness is also economically preferable. As required, the film can be treated by surface-treatment/surface-processing such as corona discharge treatment, printing, coating, vapor deposition, it can be further treated by bag-making process using various solvent and heat-sealing, perforation-making process, and adhesive sealing.

The laminated body of the invention may have at least one printed layer, the printed layer is preferably disposed on either one of the two surface of the laminated body. In case of the laminated body, in view of improving solvent resistance and following capability of the printed layer at working, the printed layer is preferably disposed on the surface of the (II) layer. The printed layer is not particularly limited; in case where the below-described heat-shrinkable label, if the printed layer is disposed on the inner surface of the laminated film (i.e. a side which faces the container or the like) when fitted over the container or the like (covered object), the printed layer will not peel or become fouled up during circulation of the product in the market, thereby it is preferable. In case where transparency of the laminated body is poor, in view of decorative effect, the printed layer is preferably disposed on the outer side of the laminated body (i.e. opposite face to the covered object). Further, the printed layer may be disposed on both side of the laminated body of the invention.

The printed layer is a layer to illustrate name of the product, the illustration, handling suggestion, and so on; it can be formed by conventional printing method such as gravure printing and flexo printing. Examples of printing ink used for forming the printed layer, include: pigment, binder resin, solvent, and other additives. Examples of the binder resin include, but not limited to, resins such as acrylic-based resin, urethane-based resin, polyamide-based resin, vinyl chloride-vinyl acetate copolymer-based resin, cellulose-based resin, and nitrocellulose-based resin; these may be used alone or in combination of two or more thereof. Examples of pigment include: white pigment such as titanium oxide (titanium dioxide), indigo pigment such as copper phthalocyanine blue, carbon black, aluminum flake, mica, and other coloring pigment; these are selected and used depending on the application. As other pigments, to adjust gloss, extender pigment such as alumina, calcium carbonate, barium sulfate, silica, and acrylic beads may be used. As the examples of the solvent, water and organic solvent such as methylethyl ketone, ethyl acetate, methyl alcohol, ethyl alcohol, and iso-propyl alcohol are usually used to improve coatability as well as compatibility and dispersiveness of each component in the coating agent in the ink of gravure printing and flexo printing.

The printed layer is changed depending on the application so that it is not particularly limited. It may be a resin layer curable by an activation energy-ray such as visible light, ultraviolet, electron beam. When the printed layer is made of an activation energy-curable resin, other than the above, for example, sensitizer and photopolymerization initiator such as photo-radical polymeric initiator and photoinitiator for cationic polymerization is preferably added to the printing ink.

Apart from the (I) layer, the (II) layer, and the printed layer, the laminated body of the invention may have a coating layer, an anchor coat Layer, a primer coat layer, an adhesive layer, and so on; if necessary, layers made of materials such as unwoven fabric, paper, metallic thin film can be disposed.

An elongated film and a heat-shrinkable film can be obtained by elongating the laminated body of the invention in at least one direction. In case where the film and laminated body of the invention is a heat-shrinkable film, heat shrinkage ratio in the main shrinking direction is desirably 10% or more, preferably 20% or more, more preferably 30% or more, and 75% or less, preferably 70% or less, more preferably 65% or less, as measured after immersing the film in hot water of 80° C. for 10 seconds. Moreover, the heat shrinkage ratio of the main shrinking direction is desirably 5% or more, preferably 10% or more, more preferably 15% or more, and 40% or less, preferably 35% or less as measured after immersing the film in hot water of 70° C. for 10 seconds.

It should be noted that the term "main shrinking direction" means a direction in which heat shrinkage ratio of either film's longitudinal direction or width direction is larger than the other; for example, the main shrinking direction means a direction equivalent to the outer circumferential direction when fitted around a bottle. On the other hand, the term "orthogonal direction" means a direction orthogonal to the main shrinking direction.

The heat shrinkage ratio at the above temperature is an index to judge adaptability of a film to shrink forming process in which the film for the use of shrinkable label for PET (polyethylene terephthalate) bottle shrinks within relatively short time (several to dozens seconds). For instance, necessary shrinkage ratio, which is required for a heat-shrinkable film applied to shrinkable label for PET bottle, is varied depending on the shape; it is generally about 20-85%.

Today, an industrially most-popular heat shrink machine for label fitting to the PET bottles is the so-called "steam-shrinker" using water vapor as a heating medium to carry out shrink forming. Moreover, in view of thermal effect to the object to be covered, and so on, it is necessary for the heat-shrinkable film to carry out sufficient heat shrinkage as lower temperature as possible. However, in case of film showing high temperature dependency and extreme difference of shrinkage ratio depending on the temperature, portions having different shrinking behavior easily occur due to uneven temperature in the steam-shrinker so that uneven shrinkage, wrinkle, pocks, and the like occur; thereby shrink finishing quality tends to be bad. From the view point including industrial productivity, as long as the film has a heat shrinkage ratio within the above range, the film can sufficiently adhere to the object to be covered in the predetermined shrink forming time but also obtain a favorable shrink finishing quality without producing uneven shrinkage, wrinkle, and pocks.

When the film and the laminated body of the invention are used as a heat-shrinkable Label, shrinkage ratio in the orthogonal direction is preferably 10% or less, more preferably 5% or less, furthermore preferably 3% or less as measured after heating in a hot water at 80° C. for 10 seconds. Moreover, when measured after heating in a hot water at 70° C. for 10 seconds, shrinkage ratio is preferably 10% or less, more preferably 5% or less, and further more preferably 3% or less. This has to be noted that if the shrinkage ratio of the film in the orthogonal direction is 10% or less, problems such as: easy shortening of dimensions in the orthogonal direction after shrinkage; easy distortion of printed patterns or letters after shrinkage; and occurrence of longitudinal sink mark in the case of bottle of prismatic shape, are difficult to occur; thus it is preferable.

When the film and the laminated body of the invention is used as a heat-shrinkable film, in view of stiffness, elongation modulus in the film's orthogonal direction is preferably 1,300 MPa or more; more preferably 1,400 MPa or more. Moreover, the upper limit of elongation modulus of usually used heat-shrinkable film is about 3,000 MPa, preferably about 2,900 MPa, and furthermore preferably about 2,800 MPa. If elongation modulus in the film's orthogonal direction is 1,300 MPa or more, it is capable of raising stiffness of the entire film. Especially, when thickness of the film is made thinner, problems (such as decline of yield due to oblique coverage or film bending at a time of fitting a packaged film over containers such as PET bottles by using labeling machines) cannot be found. Thus this elongation modulus is preferable. Average of elongation modulus in the main shrinking direction (TD: Transverse Direction) and the orthogonal direction (MD: Machine Direction) about each film is preferably 1,500 MPa or more, more preferably 1,700 MPa or more. The elongation modulus can be determined at 23° C. in accordance with JIS K7127.

Elongation modulus in the film's main shrinking direction is not specifically restricted as long as the film has a certain rigidity; it is 1,500 MPa or more, preferably 2,000 MPa or more, more preferably 2,500 MPa or more; the upper limit is 6,000 MPa or less, preferably 9,500 MPa or less, more preferably 3,500 MPa or less. By setting the elongation modulus in the film's main shrinking direction within the above range, film's rigidity in both directions can be raised. Thus, it is preferable.

When using the film and the laminated body of the invention as a heat-shrinkable film, the natural shrinkage ratio is desirably as low as possible. In general, for example, natural shrinkage ratio of a heat-shrinkable film after 30 days storage at 30° C. is desirably 1.5% or less, preferably 1.0% or less. When the natural shrinkage ratio under the above condition is 1.5% or less, even though the produced film is stored for long period, the film can stably fit around the containers and the like, thereby it is practically hard to cause any problems.

Rupture-proof resistance of the film and the laminated body of the invention used as a heat-shrinkable film is evaluated by its rupture elongation. In a rupture elongation test at 0° C., the elongation ratio in the machine direction of a film particularly for label use is 100% or more, preferably 200% or more, and further more preferably 300% or more. If rupture elongation at 0° C. is 100% or more, problems such as breakage of film at printing or packaging becomes less, whereby it is preferable. In addition, even in case where tension to the film increases with speed-up of printing, packaging, and so on, if rupture elongation is 200% or more, the film is hard to be broken; thus it is preferable.

In general, sealing strength of the film and the laminated body of the invention is desirably 3 N/15 mm wide or more, preferably 5 N/15 mm wide or more. Value of interlayer peeling strength is not particularly limited; if it is 1 N/15 mm wide or more, few troubles (such as peeling at sealed portion and between films at a time of using and heat-shrinkage) occur. When the laminated body obtained in the invention is measured in accordance with T-die peel method in which peeling is carried out in the transverse direction at a test rate of 200 mm/min under an environment of 23° C./50% RH, the sealing strength is at least 5 N/15 mm wide or more and the interlayer peeling strength exceeds at least 2 N/15 mm wide. So, peeling is hardly caused at sealed portion and between films.

Sealing strength of the film and laminated body when used as a heat-shrinkable film, it is desirably 3 N/15 mm wide or more, preferably 5 N/15 mm wide or more. Value of interlayer peeling strength is not particularly limited; if it is 1 N/15 mm wide or more, peeling is hardly caused after sealing and heat shrinkage; it is preferably 2 N/15 mm wide or more. When the heat-shrinkable film obtained in the invention is measured in accordance with T-die peel method in which peeling is carried out in the transverse direction at a test rate of 200 mm/min under an environment of 23° C./50% RH, the sealing strength is at least 5 N/15 mm wide or more and the interlayer peeling strength exceeds at least 2 N/15 mm wide. So, peeling is hardly caused at sealed portion and between films.

The elongated film and the heat-shrinkable film of the invention can be produced by a known method. The laminated body can be in a form of planar or tubular shape; in view of productivity (possibility to take several cut-films as film products from the original film in the width direction) and printability on the inner surface, planar shape is preferable. As a production method of planar film, for instance, resins are firstly melted using a plurality of extruders, and the melted resins are co-extruded from T-dies. The co-extruded material is cooled and become solidified by using chilled roll, then elongated with the roll in the longitudinal direction and with a tenter in the crosswise direction, annealed, cooled, and finally wound by a winder (if the film surface is to be printed, the surface is treated by corona discharge treatment before printing), so as to obtain the film. The planar film can also be obtained by opening up a film produced by tubular film process. Alternatively, firstly, a resin for forming an inner layer and a resin for forming an outer layer are made into sheets, respectively; then, these sheets may be laminated, for example, using a press method or a nip-roll method.

The melt-extruded resin can be elongated in the manner of mono- or bi-axial orientation by the steps of: cooling the resin with cooling roll, air, water, and so on; then heating the resin up again with an adequate method using hot-air, hot-water, infrared-ray, and the like; and finally elongating the resin using methods such as a rolling method, a tentering method, and a tubular method.

Even in the case of an application which requires a substantially monoaxially-oriented shrinkable property, such as a heat-shrinkable label for PET bottle, it is still effective to elongate the label into the vertical direction within a range which does not undermine the shrinkable property. The elongation temperature is, depending on the lamination structure and blended resin, typically 80-110° C. Moreover, when the elongation magnification increases, the rupture-proof resistance is improved; however, due to this, shrinkage ratio also increases, whereby it becomes difficult to obtain a favorable shrink finishing quality. So, the elongation magnification is extremely preferably 1.03-1.5 times.

[Molded Product, Heat-Shrinkable Label, and Container]

Since the film (including elongated film and heat-shrinkable film) and the laminated body of the present invention exhibits excellent shrink finishing quality, flexibility, transparency, and so on, its usage is not particularly limited. As required, by forming printed layer, deposited layer and other functional layers, various molded products such as bottles (blown bottles), trays, lunch boxes, containers for food of delicatessen, containers for dairy products can be obtained. Especially, when the film and the laminated body of the invention is used as heat-shrinkable labels for food containers (for instance, PET bottles or glass bottles for soft drinks or food; preferably PET bottles), the film can adhere to complex shapes (e.g., cylindrical columns, quadrangular prisms, pentagonal prisms, and hexagonal columns, these of which are respectively constricted in the middle, etc.). Thus it is capable of enabling containers to be fitted with labels of pleasing appearance without producing wrinkles and pocks. The molded products and containers of the invention can be produced by using a conventional molding method.

The film and the laminated body of the invention exhibit excellent flexibility, transparency, and shrink finishing quality. Therefore, it is not only suitably used as a heat-shrinkable label material for plastic molded products, but also suitably used as a heat-shrinkable label material for packaging (containers) using materials as constituent thereof, whose thermal expansion and water absorption rate are extremely different from that of the heat-shrinkable film of the invention, for example at least one kind of material selected from a group consisting of: metal, porcelain, glass, paper, polyolefin-based resin such as polyethylene, polypropylene, and polybutene; polymethacrylate-based resin; polycarbonate-based resin; polyester-based resin such as polyethylene terephthalate and polybutylene terephthalate; and polyamide-based resin, are used as the constituting materials.

Other than the above described resins, examples of materials constituting the plastic container which uses the film and laminated body of the invention include: polystyrene, rubber-modified high-impact polystyrene (HIPS), styrene-butyl acrylate copolymer, styrene-acrylonitrile copolymer, styrene-maleic anhydride copolymer, acrylonitrile-butadiene-styrene copolymer (ABS), methacrylic acid ester-butadiene-styrene copolymer (MBS), polyvinyl chloride-based resin, phenol resin, urea resin, melamine resin, epoxy resin, unsaturated polyester resin, and silicone resin.

The plastic container using these resins may be produced from a mixture of two or more resins or a laminated body.

EXAMPLES

Hereinafter, the invention will be more specifically described by way of the following examples.

Measurement values and evaluation criteria thereof shown in the examples are defined as follows. In the Examples, a drawing (flow) direction of the laminated film is called as MD (Machine Direction), and a direction orthogonal to the MD is called as TD (Transverse Direction).

(1) Average Refractive Index

In accordance with JIS K7142 using a Abbe refractometer manufactured by Atago Co., Ltd. and sodium D-line (589 nm) as a light source, average refractive indices of a used polylactic acid-based resin and polyolefin-based resin were measured.

(2) Crystallization Temperature (Tc), Crystal Melting Temperature (Tm)

In accordance with JIS K7121 using "Pyris1 DSC" manufactured by PerkinElmer Co., Ltd, 10 mg of a used polyolefin-based resin was heated up to 200° C. at a heating rate of 10° C./min and keeping the temperature at 200° C. for 5 minutes, then the heated resin was cooled down to the room temperature at a cooling rate of 10° C./min. The crystal melting temperature Tm (° C.) and crystallization temperature Tc (° C.) were determined from thermogram measured at the above process.

(3) Heat Quantity of Crystallization (ΔHc)

In accordance with JIS K7122 using "Pyris1 DSC" manufactured by PerkinElmer Co., Ltd, 10 mg of a used polyolefin-based resin was heated up to 200° C. at a heating rate of 10° C./min and keeping the temperature at 200° C. for 5 minutes, then the heated resin was cooled down to the room temperature at a cooling rate of 10° C./min. The heat quantity of crystallization ΔHc (J/g) was determined from thermogram measured at the above process.

(4) Internal Haze

Internal haze of the obtained film was measured in accordance with JIS K7105, then the measured haze was divided by film's thickness. The value of haze per 1 μm in thickness is shown in Table 1 together with the evaluation result based on the following criteria.

○ (good): internal haze per 1 μm is below 0.45%.
x (bad): internal haze per 1 μm is 0.45% or more.

(5) Rupture Elongation

The obtained film was cut into pieces having a size of 15 mm in MD×100 mm in TD and then rupture elongation test was carried out in accordance with JIS K7127 at 23° C. and at a rupture elongation rate of 200 mm/min. The measured rupture elongation was evaluated based on the following criteria.

⊚ (excellent): rupture elongation is 100% or more.
○ (good): rupture elongation is below 100%.
x (bad): rupture elongation is below 25%.

(6) Stiffness

The obtained film was cut into pieces having a size of 60 mm in MD×4 mm in TD, by using viscoelastic spectrometer "DVA-200" produced by IT Measurement Co., Ltd. under conditions of tensile mode at an oscillation frequency of 10 Hz, a strain of 0.1%, a temperature increase rate of 3° C./min, and a distance between chucks of 25 mm, heating was started from a temperature of −50° C. in the MD direction and storage elastic modulus (E') of the test piece was measured. Storage elastic modulus (E') at 25° C. was determined from the obtained data; then it was evaluated based on the following criteria.
 ○ (good): storage elastic modulus is 1,500 MPa or more.
 x (bad): storage elastic modulus is below 1,500 MPa.
(7) State of Interlayer Peeling
The obtained laminated film was evaluated based on the following criteria.
 ○ (good): No interlayer peeling was observed at elongation process of the laminated film.
 x (bad): Interlayer peeling was observed between any of the layers at elongation process of the laminated film.
(8) Heat Shrinkage Ratio
The obtained film was cut into pieces having a size of 100 mm in MD×100 mm in TD, amount of shrinkage in the film's main shrinking direction (crosswise direction) was measured after immersing the film in hot water of 80° C. for 10 seconds and the following immersing in cold water of 23° C. for 30 seconds; then, ratio of shrinkage amount to the original dimension before shrinkage was determined in % value.

Below, the present invention will be more specifically described by way of the following Examples and Comparative examples.

Example 1

A sufficiently dried 60 mass % of amorphous polylactic acid (commodity name: "NATURE WORKS NW4060" manufactured by Nature Works LLC, average refractive index=1.455) as the polylactic acid-based resin (A) and a 40 mass % of soft polypropylene (commodity name: "VERSIFY 2400" manufactured by The Dow Chemical Company, average refractive index=1.478, ΔHc=6.8 J/g, Tc=33.6° C., Tm=126.0° C., ethylene content=15 wt. %, MFR=2) as the polyolefin-based resin (B) were mixed; the mixture was melt-kneaded at a set temperature of 210° C. using biaxial extruder to obtain pellet of the resin composition.

Internal haze was measured about the composition and the result was shown in Table 1. The pellet of the resin composition thus obtained was drawn for cast film-forming by castroll heated at 50° C. and a film having a thickness of 50 μm was obtained; finally, the obtained film was evaluated. The results are shown in Table 1. Moreover, the results were also comprehensively evaluated; films which did not show any problems about all the evaluation items are indicated as a sign (O), other films which did show at least one problem about the evaluation items are indicated as a sign (X).

Example 2

Except for changing the polyolefin-based resin (B) from "VERSIFY 2400" to a soft polypropylene (commodity name: "VERSIFY 2200" manufactured by The Dow Chemical Company, average refractive index=1.486, ΔHc=29.5 J/g, Tc=66.3° C., Tm=136.1° C., ethylene content=9 wt. %, MFR=2), Example 2 was carried out in the same manner as Example 1 to obtain pellet of a resin composition and the film. Result of each evaluation item is shown in Table 1.

Example 3

Except for changing the amount of "NATURE WORKS NW4060" as the polylactic acid-based resin (A) from 60 mass % to 80 mass % and changing the amount of "VERSIFY 2400" as the polyolefin-based resin (B) from 40 mass % to 20 mass %, Example 3 was carried out in the same manner as Example 1 to obtain pellet of a resin composition and the film. Result of each evaluation item is shown in Table 1.

Comparative Example 1

Except for changing the polyolefin-based resin (B) from "VERSIFY 2400" to a polypropylene (commodity name: "NOBLEN FH3315" manufactured by Sumitomo Chemical Co., Ltd., average refractive index=1.503, ΔHc=85.0 J/g, Tc=103.6° C., Tm=144.6° C., ethylene content=3.2 wt. %, MFR=3), Comparative example 1 was carried out in the same manner as Example 1 to obtain pellet of a resin composition and the film. Result of each evaluation item is shown in Table 1.

Comparative Example 2

Except for changing the amount of "NATURE WORKS NW4060" as the polylactic acid-based resin (A) from 60 mass % to 95 mass % and changing the amount of "VERSIFY 2400" as the polyolefin-based resin (B) from 40 mass % to 5 mass %, Comparative example 2 was carried out in the same manner as Example 1 to obtain pellet of a resin composition and the film. Result of each evaluation item is shown in Table 1.

Comparative Example 3

Except for changing the amount of "NATURE WORKS NW4060" as the polylactic acid-based resin (A) from 60 mass % to 40 mass % and changing the amount of "VERSIFY 2400" as the polyolefin-based resin (B) from 40 mass % to 60 mass %, Comparative example 3 was carried out in the same manner as Example 1 to obtain pellet of a resin composition and the film. Result of each evaluation item is shown in Table 1.

As seen from Table 1, the film of the present invention using a mixed resin composition, defined in the invention, comprising the polylactic acid-based resin (A) and the polyolefin-based resin (B) exhibits excellent transparency (internal haze), rupture elongation, and stiffness in good balance (Examples 1 to 3). On the other hand, when heat quantity of crystallization ΔHc of the polyolefin-based resin (B) is beyond the range defined in the invention, an increase of internal haze and deterioration of transparency can be observed (Comparative example 1). In addition, when content rate of the polyolefin-based resin (B) is small and outside the range of the invention (Comparative example 2), a shortage of rupture elongation can be observed. Moreover, a content rate of the polyolefin-based resin (B) is high and outside the range of the invention (Comparative example 3), a shortage of stiffness (storage elastic modulus) can be observed.

Example 4

As the (I) layer, a mixed resin pellet having the same blending as that of Example 1 was used; as the (II) layer, a mixed resin composition comprising: 60 mass % of "NATURE WORKS NW4060", mass % of a polylactic acid (commodity name: "LACEA H440" manufactured by Mitsui Chemicals, Inc., L-body/D-body=95.75/4.25), and 10 mass % of soft polylactic acid-based resin (commodity name: "PLAMATE PD-150" manufactured by DIC Corporation was used; and as the (III) layer, a mixed resin composition comprising: 50 mass % of linear low-density polyethylene (commodity name: "UMERIT 0540F" manufactured by Ube Industries, Ltd., 35 mass % of "NOBLEN FH3315", and 15 mass % of hydrogenated petroleum resin (commodity name:

"ALCON P125" manufactured by Arakawa Chemical Industries, Ltd. was used. These were respectively fed into biaxial extruder and kneaded to obtain each of the mixed resin pellet. These mixed pellet were co-extruded using three-kind five-layer dies such that thickness of each layer of the laminated film is: (II) layer/(I) layer/(III) layer/(I) layer/(II) layer=30 μm/5 μm/180 μm/5 μm/30 μm. The obtained film was drawn by cast roll heated at 50° C., then cooled and solidified so as to obtain a laminated film having a thickness of 250 μm. Thereafter, by use of film tentering machine manufactured by KYOTO MACHINERY CO., LTD., the obtained laminated film was elongated at 5.0-time magnification in the width direction at a preheat temperature of 80° C. and an elongation temperature of 78° C.; then the film was thermally treated at 90° C. to obtain a heat-shrinkable film having a thickness of 50 μm. Evaluation results of the film are shown in Table 2.

Example 5

By using pellet of the resin composition of Example 2, Example 5 was carried out in the same manner as Example 4 to obtain a film. Results of each evaluation item are shown in Table 2.

Example 6

By using pellet of the resin composition of Example 3, Example 6 was carried out in the same manner as Example 4 to obtain a film. Results of each evaluation item are shown in Table 2.

TABLE 1

| | Mass % (A)/(B) | Internal Haze (%) | Rupture elongation | Stiffness (Storage elastic modulus: MPa) | Comprehensive evaluation |
|---|---|---|---|---|---|
| Example 1 | 60/40 | ◯ (0.23) | ◉ | ◯ (1676) | ◯ |
| Example 2 | 60/40 | ◯ (0.34) | ◉ | ◯ (1724) | ◯ |
| Example 3 | 80/20 | ◯ (0.19) | ◯ | ◯ (2322) | ◯ |
| Comparative example 1 | 60/40 | x (0.54) | x | ◯ (1757) | x |
| Comparative example 2 | 95/5 | ◯ (0.22) | x | ◯ (2783) | x |
| Comparative example 3 | 40/60 | ◯ (0.32) | ◉ | x (983) | x |

TABLE 2

| | Test item | Example 4 | Example 5 | Example 6 |
|---|---|---|---|---|
| Evaluation results | State of Interlayer peeling | ◯ | ◯ | ◯ |
| | Heat shrinkage ratio (%) | 28.5 | 29.3 | 30.3 |

As seen from Table 2, the films obtained in Examples 4 to 6 showed no interlayer peeling during elongation. It can be observed that heat shrinkage ratio of the obtained heat-shrinkable film is 28.5-30.3%.

INDUSTRIAL APPLICABILITY

By using resin composition of the present invention, a laminated body, elongated film, heat-shrinkable film, and molded product, those of which show excellent transparency and flexibility, can be produced. Hence, the elongated film and heat-shrinkable film are expected for various applications such as film, sheet material, label, and adhesive tape of packaging material, container, medical kit, building material, electric/electronic devices, and so on.

While the invention has been particularly shown and described with reference to a number of preferred embodiments thereof, it will be understood by those skilled in the art that various changes in form and details may be made without departing from the spirit and the scope of the invention. Accordingly, the invention is to be limited only by the scope of the claims and their equivalents.

The invention claimed is:

1. A polylactic acid-based resin composition comprising:
50-90 mass % of a polylactic acid-based resin (A); and
10-50 mass % of polyolefin-based resin (B),
heat quantity of crystallization of the polyolefin-based resin (B) being 40 J/g or less as measured by differential scanning calorimeter at a thermal process comprising the steps of: heating up to 200° C. at a heating rate of 10° C./min; keeping the temperature at 200° C. for 5 minutes; and cooling down to the room temperature at a cooling rate of 10° C./min.

2. A polylactic acid-based film comprising:
a resin composition comprising: 50-90 mass % of a polylactic acid-based resin (A); and 10-50 mass % of polyolefin-based resin (B),
internal haze of the film per micrometer (μm) in thickness is below 0.45%, heat quantity of crystallization of the polyolefin-based resin (B) being 40 J/g or less as measured by differential scanning calorimeter at a thermal process comprising the steps of: heating up to 200° C. at a heating rate of 10° C./min; keeping the temperature at 200° C. for 5 minutes; and
cooling down to the room temperature at a cooling rate of 10° C./min.

3. A laminated body having at least one layer of the polylactic acid-based film according to claim 2.

4. An elongated film, wherein the polylactic acid-based film according to claim 2 is elongated at least in one direction.

5. An elongated film, wherein the laminated body according to claim 3 is elongated at least in one direction.

6. A heat-shrinkable film, wherein the polylactic acid-based film according to claim 2 is elongated at least in one direction and of which heat shrinkage ratio in the main shrinking direction is 20% or more as measured after immersing the film in hot water of 80° C. for 10 seconds.

7. A heat-shrinkable film, wherein the laminated body according to claim 3 is elongated at least in one direction and of which heat shrinkage ratio in the main shrinking direction is 20% or more as measured after immersing the film in hot water of 80° C. for 10 seconds.

8. A molded product being formed from the polylactic acid-based film according to claim 2.

9. A molded product being formed from the laminated body according to claim 3.

10. A molded product being formed from the elongated film according to claim 4.

11. A molded product being formed from the heat-shrinkable film according to claim 6.

12. A heat-shrinkable label using the heat-shrinkable film according to claim 6 as the base material.

13. A container having the heat-shrinkable label according to claim 12 thereon.

14. A molded product being formed from the elongated film according to claim 5.

15. A molded product being formed from the heat-shrinkable film according to claim 7.

16. A heat-shrinkable label using the heat-shrinkable film according to claim 7 as the base material.

* * * * *